United States Patent
Noguchi et al.

(10) Patent No.: US 6,878,337 B2
(45) Date of Patent: Apr. 12, 2005

(54) PROCESS FOR PRODUCTION OF HONEYCOMB STRUCTURE

(75) Inventors: Yasushi Noguchi, Nagoya (JP); Kyoko Makino, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 85 days.

(21) Appl. No.: 10/333,608

(22) PCT Filed: May 25, 2001

(86) PCT No.: PCT/JP01/04393

§ 371 (c)(1),
(2), (4) Date: Jan. 22, 2003

(87) PCT Pub. No.: WO02/10088

PCT Pub. Date: Feb. 7, 2002

(65) Prior Publication Data

US 2003/0159619 A1 Aug. 28, 2003

(30) Foreign Application Priority Data

Jul. 31, 2000 (JP) ........................................ 2000-232520

(51) Int. Cl.[7] .................................................. B22F 5/00
(52) U.S. Cl. ........................... 419/17; 419/38; 264/432; 264/434; 264/460; 264/489; 264/491; 264/29.1; 264/109; 264/123; 264/125
(58) Field of Search ................................ 264/109–128, 264/432, 460, 489, 434, 491, 29.1; 419/17, 38

(56) References Cited

U.S. PATENT DOCUMENTS 5,238,627 A * 8/1993 Matsuhisa et al. .......... 264/645
6,206,992 B1 * 3/2001 Baek et al. ............... 156/89.11

FOREIGN PATENT DOCUMENTS

| EP | 0 700 718 A1 | | 3/1996 |
| JP | A 59-30761 | | 2/1984 |
| JP | A 61-31341 | | 2/1986 |
| JP | 05039310 A | * | 2/1993 |
| JP | B2 2612878 | | 2/1997 |
| JP | B2 3015402 | | 12/1999 |

* cited by examiner

Primary Examiner—Stephen J. Lechert, Jr.
(74) Attorney, Agent, or Firm—Oliff & Berridge, PLC

(57) ABSTRACT

A process for producing a honeycomb structure, which comprises adding water to a mixed raw material of a raw material powder and a binder, kneading the mixture to obtain a plastic mixture, molding the plastic mixture into a honeycomb shape to obtain a green honeycomb structure, drying the structure by a step including hot-air drying, and firing the resulting dried honeycomb structure, wherein the binder contains hydroxypropyl methyl cellulose as a major component. The process can produce a crack-free high-quality honeycomb structure rapidly at a low cost.

13 Claims, No Drawings

PROCESS FOR PRODUCTION OF HONEYCOMB STRUCTURE

CROSS-REFERENCE TO RELATED APPLICATION

This is a 371 of PCT/JP01/04393, filed on May 25, 2001.

TECHNICAL FIELD

The present invention relates to a process for producing a honeycomb structure. More particularly, the present invention relates to a process for producing a honeycomb structure, which can produce a crack-free high-quality honeycomb structure rapidly at a low cost.

BACKGROUND ART

Honeycomb structures have a structure in which a plurality of through-holes are formed by thin partition walls, in a honeycomb shape. Of such honeycomb structures, those made of a ceramic material [e.g. silicon carbide (SiC)] are in use as an exhaust gas purification apparatus for capturing and removing the fine particle carbon present in an exhaust gas emitted from a diesel engine, etc.

Honeycomb structures have hitherto been produced by a process which comprises mixing a ceramic material with a binder composed mainly of methyl cellulose, adding, to the resulting mixed raw material, a liquid medium, ordinarily water in a given amount, kneading the mixture to obtain a plastic mixture, molding the plastic mixture into a honeycomb shape to obtain a green honeycomb structure, subjecting the green honeycomb structure to hot-air drying, and firing the dried honeycomb structure.

In this production process, however, the rate of removing the liquid medium component in the green honeycomb structure is small and the rates of drying at the surface and inside of the green honeycomb structure differ largely from each other; therefore, there has been a problem in that the green honeycomb structure comes to have a strain caused by a difference in contraction on drying between the surface and inside of the green honeycomb structure and cracks are generated in the dried honeycomb structure.

In contrast, a process is proposed in which a green honeycomb structure is dried by a drying step consisting of a combination of hot-air drying and microwave drying or dielectric drying, to remove, by the microwave drying or the dielectric drying, the most part of a liquid medium present in the green honeycomb structure. In the case of a honeycomb structure using a non-electroconductive ceramic material (e.g. cordierite), the whole honeycomb structure can be dried rapidly and uniformly; therefore, the process is advantageous in that the generation of cracks caused by drying can be prevented significantly.

In the production process, however, when an electroconductive ceramic material [e.g. silicon carbide (SiC)] is used, the applied microwave or the like is absorbed at the surface of the green honeycomb structure and drying is insufficient at the inside where the microwave or the like does not reach. Therefore, when the ratio of removal of the liquid medium in the green honeycomb structure by microwave drying or the like is high, for example, higher than 65%, a strain appears owing to a difference in contraction on drying between the surface and inside of the green honeycomb structure; as a result, there have been cases that cracks are generated in the dried honeycomb structure or significant heat generation takes place at the surface of the green honeycomb structure, resulting in complete combustion of the binder during the drying step.

On the other hand, when the ratio of removal of the liquid medium in the green honeycomb structure by microwave drying or the like is low, for example, not higher than 65%, the rate of removal of the liquid medium from the green honeycomb structure is small and a difference in drying rate appears between the surface and inside of the green honeycomb structure; as a result, a strain appears as well in the molded structure owing to a difference in contraction on drying between the surface and inside of the green honeycomb structure and it may form cracks in the dried honeycomb structure.

Meanwhile, there are proposed processes for producing a honeycomb structure, wherein a green honeycomb structure is dried by vacuum drying or freeze-drying and thereby the surface and inside of the green honeycomb structure can be dried uniformly regardless of the kind of the ceramic material used (see Japanese Patent Nos. 2612878, 3015402, etc.).

In these production processes, however, since drying is conducted uniformly, an extremely long drying time and accurate control of drying conditions are necessary; therefore, there have been problems in that quick production is difficult and a high production cost is required.

DISCLOSURE OF THE INVENTION

The present invention has been made in view of the above problems and aims at providing a process for producing a honeycomb structure, which can produce a honeycomb structure rapidly at a low cost without generating cracks. The present inventor made a study in order to achieve the above task and, as a result, found out that by drying a green honeycomb structure prepared from a mixed raw material using a binder containing, as a major component, a hydroxypropyl methyl cellulose having particular properties, especially a hydroxypropyl methyl cellulose having a water separation ratio of 40% or more, rapid and uniform drying of green honeycomb structure is possible regardless of the kind of the raw material powder used. The present invention has been completed based on the finding.

According to the present invention there is provided a process for producing a honeycomb structure, which comprises adding water to a mixed raw material of a raw material powder and a binder, kneading the mixture to obtain a plastic mixture, molding the plastic mixture into a honeycomb shape to obtain a green honeycomb structure, drying the structure by a step including hot-air drying, and firing the resulting dried honeycomb structure, characterized in that the binder contains hydroxypropyl methyl cellulose as a major component (hereinafter, this process may be referred to simply as "the first embodiment).

In the production process according to the present invention, the hydroxypropyl methyl cellulose which is a major component of the binder, preferably has a water separation ratio specified by the following formula (1), of 40% or more.

$$\text{water separation ration} = (Wb-Wa)/(Wb) \times 100 \tag{1}$$

(In the formula, Wa is a gel weight after water separation and Wb is a gel weight before water separation).

The binder may further contain at least one kind selected from the group consisting of methyl cellulose, hydroxyethyl cellulose, carboxymethyl cellulose and a polyvinyl alcohol.

In the production process, the mixed raw material is preferably a mixture of 68 to 98% by weight of a raw material powder, 2 to 15% by weight of a binder and 0 to 30% by weight of additives.

In the production process, the drying step preferably includes a step of hot-air drying capable of removing the liquid medium in the green honeycomb structure by an amount of 35% or more and more preferably further includes a step of microwave drying and/or dielectric drying.

Also in the production process according to the present invention, there is provided a process for producing a honeycomb structure, characterized in that the raw material powder contains SiC in an amount of 50% or more (hereinafter, may be referred to as "the second embodiment").

In the second embodiment as well, the hydroxypropyl methyl cellulose which is a major component of the binder, preferably has a water separation ratio specified by the following formula (1), of 40% or more.

$$\text{water separation ration} = (Wb - Wa)/(Wb) \times 100 \qquad (1)$$

(In the formula, Wa is a gel weight after water separation and Wb is a gel weight before water separation).

In this embodiment as well, the binder may contain, in addition to hydroxypropyl methyl cellulose, at least one kind selected from the group consisting of methyl cellulose, hydroxyethyl cellulose, carboxymethyl cellulose and a polyvinyl alcohol.

In this embodiment, the mixed raw material is preferably a mixture of 68 to 98% by weight of a raw material powder containing SiC in an amount of 50% or more, 2 to 15% by weight of a binder and 0 to 30% by weight of additives.

In this embodiment as well, drying of the green honeycomb structure preferably includes a step of hot-air drying capable of removing the liquid medium in the green honeycomb structure by an amount of 35% or more and more preferably further includes a step of microwave drying and/or dielectric drying.

In the production process according to the present invention, there is also provided a process for producing a honeycomb structure, characterized in that the raw material powder contains SiC and a metal in a total amount of 90% or more (hereinafter, may be referred to as "the third embodiment").

In the third embodiment as well, the hydroxypropyl methyl cellulose which is a major component of the binder, preferably has a water separation ratio specified by the following formula (1), of 40% or more.

$$\text{Water separation ration} = (Wb - Wa)/(Wb) \times 100 \qquad (1)$$

(In the formula, Wa is a gel weight after water separation and Wb is a gel weight before water separation).

Of course, in this embodiment as well, the binder may contain, in addition to hydroxypropyl methyl cellulose, at least one kind selected from the group consisting of methyl cellulose, hydroxyethyl cellulose, carboxymethyl cellulose and a polyvinyl alcohol.

In this embodiment, the mixed raw material is preferably a mixture of 68 to 98% by weight of a raw material powder containing SiC and a metal in a total amount of 90% or more, 2 to 15% by weight of a binder and 0 to 30% by weight of additives.

In this embodiment as well, drying of the green honeycomb structure preferably includes a step of hot-air drying capable of removing the liquid medium in the green honeycomb structure by an amount of 35% or more and more preferably further includes a step of microwave drying and/or dielectric drying.

BEST MODE FOR CARRYING OUT THE INVENTION

The modes for carrying out the present invention are specifically described below.

1. First Embodiment

In the first embodiment of the present invention, first, a raw material powder is mixed with a binder containing hydroxypropyl methyl cellulose as a major component, to prepare a mixed raw material.

The raw material powder used in the first embodiment contains a ceramic material such as inorganic oxide, inorganic carbide, inorganic nitride, inorganic boride, semiconductor and the like, and its mixture with a metal or the like.

As the ceramic material contained in the raw material powder, there can be mentioned, for example, those containing at least one kind selected from the group consisting of silicon, titanium, zirconium, silicon carbide, boron carbide, titanium carbide, zirconium carbide, silicon nitride, boron nitride aluminum nitride, aluminum oxide, zirconium oxide, mullite, raw materials for cordierite, aluminum titanate, sialon, kaolin and talc.

The ceramic material may be composed of any of various crystalline substances (e.g. α-crystalline substances and β-crystalline substances) and amorphous substances and may be a mixture of two or more kinds of crystal systems.

As the metal contained in the raw material powder, there can be mentioned those containing at least one kind selected from the group consisting of copper, aluminum, iron, nickel and silicon. These metals can be used singly or in combination of two or more kinds.

The metal is contained in the raw material powder in an amount of preferably 5 to 80% by weight, more preferably 10 to 60% by weight, particularly preferably 20 to 40% by weight.

The binder used in the present invention contains hydroxypropyl methyl cellulose as a major component. Incidentally, the major component refers to that it is contained in an amount sufficient to exhibit an intended effect in the production process according to the present invention.

By using hydroxypropyl methyl cellulose as a major component of the binder, rapid and uniform drying is possible particularly in hot-air drying; rapid and uniform drying is possible in a drying step described later, not only when cordierite of low electroconductivity is used in the raw material powder but also when SiC of high electroconductivity or the like is used in the raw material powder; and a crack-free high-quality honeycomb structure can be produced.

Therefore, the binder may be hydroxypropyl methyl cellulose alone or a mixture of hydroxypropyl methyl cellulose with other composition. However, preferred is a binder containing hydroxypropyl methyl cellulose in an amount of 70% by weight or more, more preferred is a binder containing the cellulose in an amount of 80% by weight or more, particularly preferred is a binder containing the cellulose in an amount of 90% by weight or more.

When the amount is less than 70% by weight, rapid and uniform drying is difficult in hot-air drying described later; as a result, the honeycomb structure obtained may generate cracks.

As the hydroxypropyl methyl cellulose which is a major component of the binder, there can be mentioned one having a methoxy substitution degree of 28.1 to 30.0% by weight and a hydroxypropyl substitution degree of 5.7 to 12.0% by weight. Further, the hydroxypropyl methyl cellulose which is a major component of the binder, preferably has a water separation ratio of 40% or more.

When the water separation ratio is less than 40%, rapid drying by hot-air drying described later is difficult, a strain appears during drying owing to a difference in contraction on drying, between the inside and outside of green honeycomb structure, and the resulting honeycomb structure may generate cracks.

Here, "water separation ratio" is an index of the easiness of drying of cellulose derivative and was measured by a method shown below.

First, there was prepared an aqueous solution which contains 1% by weight of methyl cellulose and 1% by weight of a cellulose derivative to be evaluated (2% by weight in total); 50 g of this aqueous cellulose derivative solution was heated in a closed vessel at 90° C. for 1 hour. In this case, the weight of the cellulose derivative gel formed by heating is measured and taken as a gel weight before water separation.

Then, the cellulose derivative gel was allowed to stand on a net placed in another closed vessel.

As the crystal growth aid, there can be mentioned, for example, magnesia, silica, yttria and iron oxide; as the dispersing agent, there can be mentioned, for example, ethylene glycol, dextrin, fatty acid soap and a polyalcohol; as the pore former, there can be mentioned, for example, graphite, wheat flour, starch, a phenolic resin and a polyethylene terephthalate.

The mixed raw material used in the present invention is preferably a mixture of 68 to 98% by weight of a raw material powder, 2 to 15% by weight of a binder and 0 to 30% by weight of additives; more preferably a mixture of 70 to 95% by weight of a raw material powder, 3 to 10% by weight of a binder and 0 to 25% by weight of additives; particularly preferably a mixture of 75 to 90% by weight of a raw material powder, 3 to 8% by weight of a binder and 0 to 20% by weight of additives.

When the content of the raw material powder is less than 68%, sintering may be insufficient and, when the content is more than 98%, molding may be impossible. When the content of the binder is less than 2%, molding may be impossible and, when the content is more than 15%, cracks may be generated in firing. When the content of the additives is more than 30%, cracks may be generated in firing.

In the process for producing a honeycomb structure according to the present invention, next, the above-mentioned mixed raw material is mixed with a given amount of water, followed by kneading, to obtain a plastic mixture.

The amount of water mixed is preferably 10 to 40 parts by weight, more preferably 15 to 35 parts by weight, particularly preferably 15 to 30 parts by weight relative to 100 parts by weight of the mixed raw material.

When the amount is less than 10 parts by weight, the plasticity of the raw material composition is insufficient, making its molding difficult. When the amount is more than 40 parts by weight, the raw material composition has fluidity, making its molding difficult as well.

In the process for producing a honeycomb structure according to the present invention, then, the above-mentioned plastic mixture is molded into a green honeycomb structure.

There is no particular restriction as to the method of molding. However, extrusion is preferred from the standpoint of mass production.

Specifically, there can be mentioned, for example, a molding method which comprises molding a plastic mixture into a cylindrical shape using a vacuum pug mill and then molding the cylindrical shape into a honeycomb shape using a ram extruder.

In the process for producing a honeycomb structure according to the present invention, then, the green honeycomb structure is dried by a step including hot-air drying, preferably a step including hot-air drying capable of removing a liquid medium present in the green honeycomb structure by 35% or more.

In the present invention, since a binder containing hydroxypropyl methyl cellulose as a major component is used, rapid and uniform drying is possible even when there is used a step including hot-air drying (in particular, a step including hot-air drying capable of removing a liquid medium present in the green honeycomb structure by 35% or more), and a crack-free honeycomb structure can be produced rapidly at a low cost.

The drying step may include, besides the above, for example, at least one kind selected from the group consisting of microwave drying, dielectric drying, reduced pressure vacuum drying and freeze-drying.

The drying step preferably includes, of these drying, microwave drying and/or dielectric drying, for rapid drying.

In the process for producing a honeycomb structure according to the present invention, lastly, the dried honeycomb structure obtained by the above-mentioned drying step is fired.

There is no particular restriction as to the method of firing, and the firing can be conducted by an ordinary method.

2. Second Embodiment

In the second embodiment of the present invention, first, a raw material powder containing 50% by weight or more of silicon carbide (SiC) is mixed with a binder containing hydroxypropyl methyl cellulose as a major component, to prepare a mixed raw material.

Thereby, a green honeycomb structure can be dried rapidly and uniformly as described later, even when there is used, for production of a honeycomb structure, a raw material powder containing 50% by weight or more of silicon carbide (SiC) which has a very high mechanical strength and a high electrical conductivity and is difficult to subject to microwave drying or dielectric drying.

The raw material powder used in the second embodiment can contain, besides silicon carbide (SiC), a ceramic material containing at least one kind selected from the group consisting of silicon, titanium, zirconium, silicon carbide, boron carbide, titanium carbide, zirconium carbide, silicon nitride, boron nitride, aluminum nitride, aluminum oxide, zirconium oxide, mullite, raw materials for cordierite, aluminum titanate, sialon, kaolin and talc.

The ceramic material may be any of various crystalline substances (e.g. α-crystalline substances and β-crystalline substances) and amorphous substances and may be a mixture of two or more kinds of crystal systems.

The binder used in this embodiment is the same as described in the first embodiment, but preferably contains, as a major component, a hydroxypropyl methyl cellulose having a water separation ratio of 40% or more because a raw material powder of high electrical conductivity is used.

In this embodiment, then, the above-mentioned mixed raw material is mixed with water, followed by kneading, to obtain a plastic mixture; the plastic mixture is molded into a honeycomb shape to obtain a green honeycomb structure.

The preparation and molding of the plastic mixture are conducted in the same manner as in the first production process.

In the second embodiment of the present invention, then, the green honeycomb structure is dried. The drying of the green honeycomb structure can be conducted, for example, by a step containing at least one kind selected from the group consisting of hot-air drying, microwave drying, dielectric drying, reduced pressure drying, vacuum drying and freeze-drying.

In particular, there is preferred a step containing hot-air drying capable of removing a liquid medium in the green honeycomb structure by 35% or more and, for quicker drying, there is more preferred a step further containing microwave drying and/or dielectric drying.

In this embodiment of the present invention, lastly, the dried honeycomb structure obtained by the above drying step is fired.

The method of firing is the same as in the first embodiment.

3. Third Embodiment

In the third embodiment of the present invention, first, a raw material powder containing SiC and a metal in a total amount of 90% or more is mixed with a binder containing hydroxypropyl methyl cellulose as a major component, to prepare a mixed raw material.

Thereby, various dryings such as hot-air drying, microwave drying, dielectric drying and the like, described later can be conducted rapidly and uniformly even when there is used, in order to produce a honeycomb structure, a raw material powder containing, in a total amount of 90% or more, a metal and SiC having a very high electrical conductivity and difficult to subject to microwave drying and dielectric drying.

As the metal contained in the raw material powder, there can be mentioned one containing at least one kind selected from the group consisting of copper, aluminum, iron, nickel and silicon. These metals can be used singly or in combination of two or more kinds.

The metal is contained in the raw material powder in an amount of preferably 5 to 80% by weight, more preferably 10 to 60% by weight, particularly preferably 20 to 40% by weight.

The raw material powder used in the third embodiment can contain, besides SiC and a metal, a ceramic material containing at least one kind selected from the group consisting of silicon, titanium, zirconium, silicon carbide, boron carbide, titanium carbide, zirconium carbide, silicon nitride, boron nitride aluminum nitride, aluminum oxide, zirconium oxide, mullite, raw materials for cordierite, aluminum titanate, sialon, kaolin, talc, etc.

The ceramic material may be any of various crystalline substances (e.g. α-crystalline substances and β-crystalline substances) and amorphous substances and may be a mixture of two or more kinds of crystal systems.

The binder used in the third embodiment is the same as described in the first embodiment, but preferably contains, as a major component, a hydroxypropyl methyl cellulose having a water separation ratio of 40% or more because a raw material powder of high electrical conductivity is used.

In the third embodiment of the present invention, then, in the same manner as in the second embodiment, the above-mentioned mixed raw material is mixed with water, followed by kneading, to obtain a plastic mixture; the plastic mixture is molded into a honeycomb shape to obtain a green honeycomb structure.

The preparation and molding of the plastic mixture are conducted in the same manner as in the first embodiment.

Then, the thus-obtained green honeycomb structure is dried.

The drying of the green honeycomb structure can be conducted by a step containing at least one kind selected from the group consisting of hot-air drying, microwave drying, dielectric drying, reduced pressure drying, vacuum drying and freeze-drying.

In particular, there is preferred a step containing hot-air drying capable of removing a liquid medium in the green honeycomb structure by 35% or more and, for quicker drying, there is more preferred a step further containing microwave drying and/or dielectric drying.

In the third embodiment of the present invention, lastly, the dried honeycomb structure obtained by the above drying step is fired.

The method of firing, the firing conditions, etc. are the same as in the first embodiment.

The present invention is described more specifically below by way of Examples. However, the present invention is in no way restricted by these Examples.

EXAMPLE 1

A mixed raw material consisting of 300 kg of silicon carbide (SiC) as a ceramic raw material, 25 kg of a binder composed of a hydroxypropyl methyl cellulose having a water separation ratio of 37% and 1.2 kg of a surfactant (potassium laurate) was kneaded with 85 kg of water for 50 minutes using a kneader. The kneaded material was molded into a cylindrical shape using a vacuum pug mill. The cylindrical shape was passed through a ram extruder to obtain a honeycomb structure having a diameter of 150 mm, a slit width of 0.3 mm and a cell density of 47 cells/cm$^2$. The green honeycomb structure obtained was cut into a length of 200 mm, followed by drying for 15 minutes using a microwave drier of 1.6 kW.

Then, the resulting material was dried at about 120° C. for 2 hours using a hot-air drier to remove the water in the green honeycomb structure completely to obtain a dried honeycomb structure.

EXAMPLE 2 to 18 AND COMPARATIVE EXAMPLES 1 to 6

Dried honeycomb structures were obtained in the same manner as in Example 1 except that raw materials and binders shown in Tables 1 and 2 were used and microwave drying was conducted for times shown in Table 2.

TABLE 1

| Kind of binder | Binder composition | Viscosity of 2% aqueous solution at 20° C. (mPa · s) | Methoxyl group (wt. %) | Hydroxypropoxyl group (wt. %) | Water separation ratio (%) |
| --- | --- | --- | --- | --- | --- |
| A | Hydroxypropyl methyl cellulose | 29000 | 28.1 | 5.7 | 37 |
| B | Hydroxypropyl methyl cellulose | 4000 | 29.0 | 9.3 | 42 |
| C | Hydroxypropyl methyl cellulose | 28000 | 29.5 | 9.4 | 46 |
| D | Methyl cellulose | 8000 | 28.4 | — | 25 |

TABLE 1-continued

| Kind of binder | Binder composition | Viscosity of 2% aqueous solution at 20° C. (mPa · s) | Methoxyl group (wt. %) | Hydroxypropoxyl group (wt. %) | Water separation ratio (%) |
|---|---|---|---|---|---|
| E | Hydroxyethyl cellulose | 5000 | — | — | No gel formation and measurement was impossible. |
| F | Carboxymethyl cellulose | 700 | — | — | No gel formation and measurement was impossible. |

TABLE 2

| | Raw material powder | Kind of binder used | Time of microwave drying (min) | Ratio of microwave drying (%) | Ratio of hot-air drying (%) | Cracks on drying |
|---|---|---|---|---|---|---|
| Ex. 1 | SiC | A | 15 | 55 | 45 | No |
| Ex. 2 | SiC | B | 14 | 50 | 50 | No |
| Ex. 3 | SIC | C | 16 | 58 | 42 | No |
| Ex. 4 | SiC: 70 wt. % + Si3N4: 30 wt % | B | 12 | 45 | 55 | No |
| Ex. 5 | SiC: 50 wt % + glass: 50 wt % | A | 16 | 65 | 35 | No |
| Ex. 6 | SiC: 70 wt % + AiN: 30 wt % | B | 14 | 51 | 49 | No |
| Ex. 7 | SiC: 70 wt % + TiC: 30 wt % | C | 13 | 48 | 52 | No |
| Ex. 8 | SiC: 70 wt % + ZrC: 30 wt % | C | 14 | 46 | 54 | No |
| Ex. 9 | SiC: 70 wt % + B4C: 30 wt % | B | 16 | 59 | 41 | No |
| Ex. 10 | SiC: 80 wt % + Si: 20 wt % | B | 19 | 63 | 37 | No |
| Ex. 11 | SiC: 60 wt % + Si: 40 wt % | C | 19 | 55 | 45 | No |
| Ex. 12 | SiC: 40 wt % + Si: 60 wt % | C | 16 | 47 | 53 | No |
| Ex. 13 | SiC: 80 wt % + Cu: 20 wt % | C | 18 | 56 | 44 | No |
| Ex. 14 | SiC: 80 wt % + Al: 20 wt % | C | 17 | 57 | 43 | No |
| Ex. 15 | SiC: 80 wt % + Fe: 20 wt % | C | 17 | 52 | 48 | No |
| Ex. 16 | SiC: 80 wt % + Ni: 20 wt % | C | 17 | 51 | 49 | No |
| Ex. 17 | Raw materials for cordierite | C | 12 | 53 | 47 | No |
| Ex. 18 | Alumina | C | 10 | 41 | 59 | No |
| Comp. Ex. 1 | SiC | D | 15 | 56 | 44 | Yes |
| Comp. Ex. 2 | SiC: 80 wt % + Si: 20 wt % | D | 13 | 44 | 56 | Yes |
| Comp. Ex. 3 | Raw materials for cordierite | D | 17 | 78 | 22 | No |
| Comp. Ex. 4 | Raw materials for cordierite | D | 12 | 55 | 45 | Yes |
| Comp. Ex. 5 | Raw materials for cordierite | L | 13 | 60 | 40 | Yes |
| Comp. Ex. 6 | Raw materials for cordierite | F | 12 | 57 | 43 | Yes |

Raw materials for cordierite: kaolin: 48 wt % + talc: 39 wt % + alumina: 13 wt%

Evaluation Methods and Evaluation
1. Evaluation Methods
(1) Microwave Drying Ratio and Hot-Air Drying Ratio In Examples 1 to 18 and Comparative Examples 1 to 6, each green honeycomb structure obtained from an extruder was cut into a length of 200 mm, and the weight (W1) was measured at that point. Then, the structure was dried using a microwave drier and the weight (W2) was measured at the time when microwave drying was completed. Lastly, drying was conducted using a hot-air drier and the weight (W3) was measured at the time when hot-air drying was completed. Using these weights (W1, W2 and W3), microwave drying ratio and hot-air drying ratio were determined from the following formulae (2) and (3):

$$\text{Microwave drying ratio} = (W1-W2)/(W1-W3) \times 100 \quad (2)$$

and, $$\text{Hot-air drying ratio} = (W2-W3)/(W1-W3) \times 100 \quad (3).$$

(2) Generation of Cracks

After the completion of drying using a hot-air drier, generation of cracks in dried honeycomb structure was observed visually.

2. Evaluation

In each of Examples 1 to 18 wherein hydroxypropyl methyl cellulose was used as a binder, the hot-air drying ratio was 35% or more but the molded structure after drying generated no cracks. In particular, in Examples 10 to 16 wherein there was used a raw material powder containing a metal powder and having an electrical conductivity higher than in Examples 1 to 9, there was used a binder B or C each consisting of a hydroxypropyl methyl cellulose having a water separation ratio of 40% or more and therefore a crack-free dried material could be obtained although the hot-air drying ratio was 35% or more.

In contrast, in Comparative Examples 1 to 6 wherein no hydroxypropyl methyl cellulose was used as a binder, cracks generated in all Comparative Examples other than Comparative Example 3, wherein the hot-air drying ratio was 35% or more, although no cracks generated in Comparative Example 3 wherein raw materials for cordierite were used as a ceramic raw material, the microwave drying ratio was 78% and the hot-air drying ratio was 22%.

Industrial Applicability

According to the process for producing a honeycomb structure according to the present invention, a crack-free high-quality honeycomb structure can be produced rapidly at a low cost. Therefore, the present process is thought to have high industrial applicability.

What is claimed is:

1. A process for producing a honeycomb structure, which comprises adding water to a mixed raw material of a raw material powder and a binder, kneading resulting mixture to obtain a plastic mixture, molding the plastic mixture into a honeycomb shape to obtain a green honeycomb structure, drying the structure by a step including hot-air drying, and firing resulting dried honeycomb structure, to form a porous honeycomb structure, wherein the binder contains hydroxypropyl methyl cellulose as a major component.

2. A process for producing a honeycomb structure according to claim 1, wherein the hydroxypropyl methyl cellulose has a water separation ratio represented by the following formula (1), of 40% or more:

$$\text{water separation ration} = (Wb - Wa)/(Wb) \times 100 \qquad (1)$$

(in the formula, Wa is a gel weight after water separation and Wb is a gel weight before water separation).

3. A process for producing a honeycomb structure according to claim 2, wherein the binder further contains at least one kind selected from the group consisting of methyl cellulose, hydroxyethyl cellulose, carboxymethyl cellulose and a polyvinyl alcohol.

4. A process for producing a honeycomb structure according to claim 1, wherein the drying of the green honeycomb structure includes a step of conducting hot-air drying to remove 35% or more of the water present in the green honeycomb structure.

5. A process for producing a honeycomb structure according to claim 4, wherein the drying of the green honeycomb structure further includes a step of conducting microwave drying and/or dielectric drying to remove the water present in the green honeycomb structure.

6. A process for producing a honeycomb structure according to claim 1, wherein the mixed raw material is obtained by mixing 68 to 98% by weight of the raw material powder, 2 to 15% by weight of the binder and 0 to 30% by weight of other additives.

7. A process for producing a honeycomb structure according to claim 6, wherein the raw material powder contains 50% or more of SiC.

8. A process for producing a honeycomb structure according to claim 6, wherein the raw material powder contains SiC and a metal in a total amount of 90% or more.

9. A process for producing a honeycomb structure according to claim 6, wherein the metal contains at least one kind selected from the group consisting of copper, aluminum, iron, nickel and silicon.

10. A process for producing a honeycomb structure according to claim 6, wherein the other additives include at least one of a crystal growth aid, a dispersing agent, and a pore former.

11. A process for producing a honeycomb structure according to claim 10, wherein the crystal growth aid includes at least one of magnesia, silica, yttria and iron oxide.

12. A process for producing a honeycomb structure according to claim 10, wherein the dispersing agent includes at least one of ethylene glycol, dextrin, fatty acid soap and polyalcohol.

13. A process for producing a honeycomb structure according to claim 10, wherein the pore former includes at least one of graphite, wheat flour, starch, phenolic resin and polyethylene terephthalate.

* * * * *